D. C. McCAN.
WEIGHING DEVICE.
APPLICATION FILED JAN. 26, 1910.
982,381.
Patented Jan. 24, 1911.
2 SHEETS—SHEET 1.
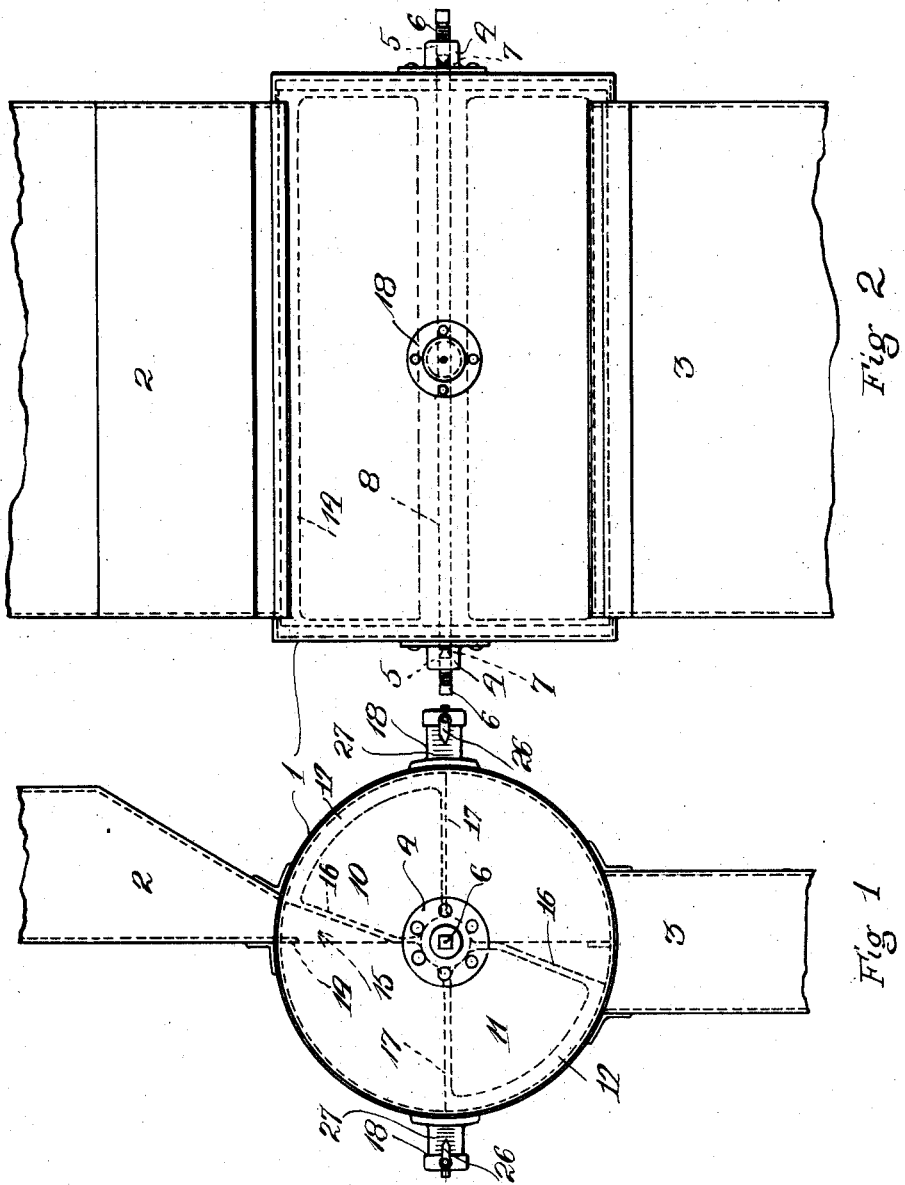

D. C. McCAN.
WEIGHING DEVICE.
APPLICATION FILED JAN. 26, 1910.
982,381.
Patented Jan. 24, 1911.
2 SHEETS—SHEET 2.
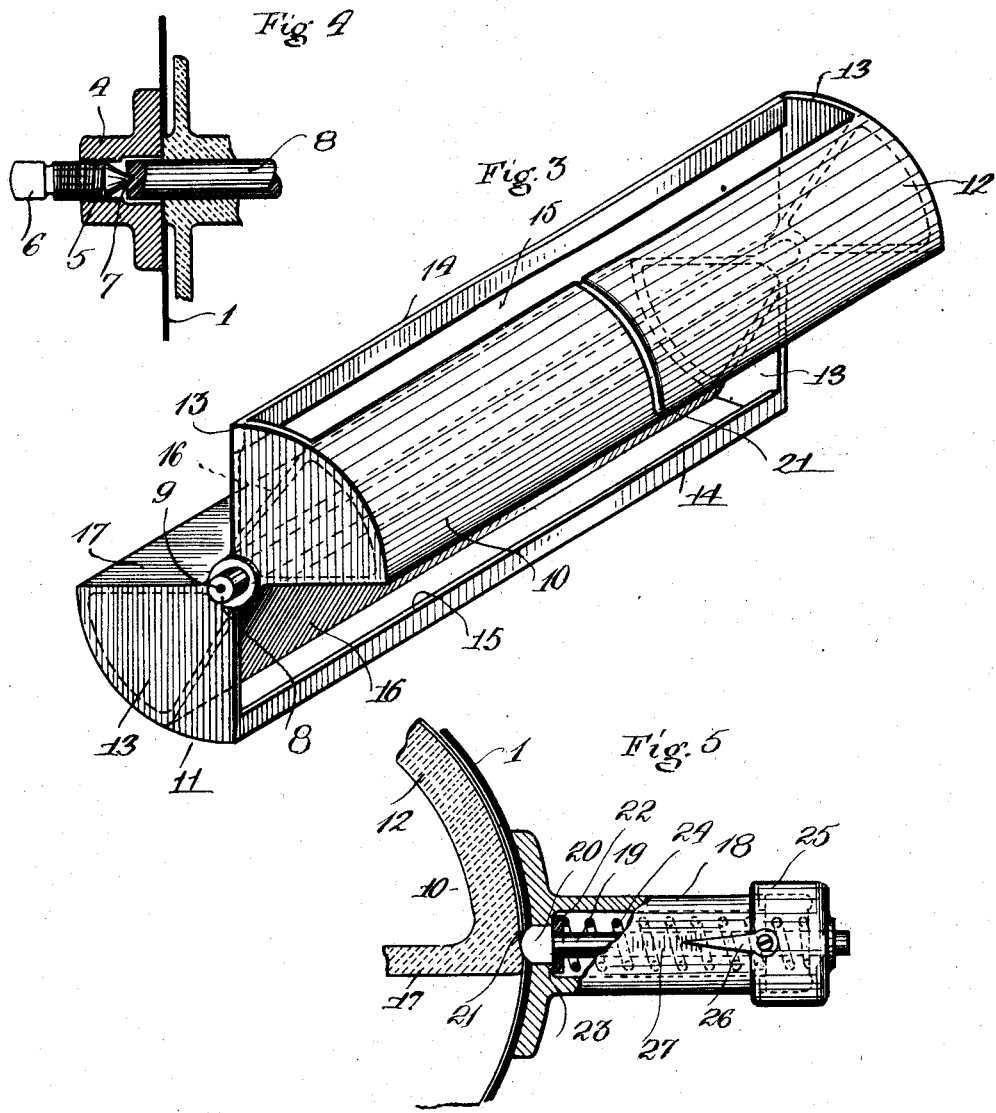
Witnesses
Inventor
David C. McCan
by Anton Glatzner Jr.
his Attorney

UNITED STATES PATENT OFFICE.

DAVID C. McCAN, OF LOS ANGELES, CALIFORNIA.

WEIGHING DEVICE.

982,381.  Specification of Letters Patent.  Patented Jan. 24, 1911.

Application filed January 26, 1910. Serial No. 540,181.

*To all whom it may concern:*

Be it known that I, DAVID C. McCAN, a citizen of the United States, residing at Los Angeles, in the county of Los Angeles and State of California, have invented a certain new and useful Weighing Device, of which the following is a specification.

This invention relates to a weighing device, and has particular reference to a combined weighing and dumping device.

An object of this invention is to provide a device in which the weight of the material is previously determined, and in which the dumping of the material occurs automatically when the pressure exceeds that previously determined.

Another object of this invention is to provide a simple light, compact and convenient weight-determining device particularly for loose waste material, such as saw-dust, wood-shavings and the like.

With these and other objects in view, this invention consists of the features, details of construction and combination of parts, described in connection with accompanying drawings, and then more specifically pointed out in the claims.

In the drawings, Figure 1, is a side elevation, showing the cylinder, the hopper, and the vanes on the shaft, the latter being shown in dotted lines. Fig. 2, is a front elevation of the same. Fig. 3, is a perspective view of the vanes. Fig. 4, is a sectional fragmentary view, showing the means for pivotally balancing the shaft for carrying the vanes, and Fig. 5, is a sectional side elevation, partly broken, showing the plunger and spring for holding the vanes.

Specific reference being had to the drawings, 1, designates a cylinder, provided on the top thereof with a hopper 2, and on the bottom with a discharge chute 3. Boxings 4, are fixed to each end of the cylinder 1, these boxings being provided with threaded orifices 5 for the accommodation of pins 6, having acuminate conical points 7, which form pivotal bearings for a shaft or journal 8, which is provided in the ends thereof with central recesses 9, in which the points of said pins 6 fit. Fixedly mounted on said shaft or journal 8, are two vanes, 10 and 11, in the form of sectors oppositely disposed and equally balanced. Each vane comprises two side walls, 16 and 17, extending parallel with the shaft and substantially radial to it and connected at their outer ends to a peripheral wall 12 which is less than a quadrant, and which runs close to the peripheral wall of the stationary inclosing cylinder. The vanes or sectors are also provided with end walls, 13, which are substantially quadrants, and ribs or bars 14 connect the end walls of the vanes at their peripheries and at a distance from the faces 16 equal to the width of the lower end of the feed chute 2, so that when the vanes are in the position shown in dotted lines in Fig. 1 the inclined face 16 of the vane 10 will register with one side of the feed chute and the rib 14 will register with the other side of said chute, and material passing from the feed chute will be deflected by the side 16 of the vane or sector 10 onto the side 17 of the vane or sector 11. Fastened on opposite sides of said cylinder 1, are two housings 18, and being identical in structure, only one will be described in detail.

Located within the housing is a plunger 19, provided with a head 20, which extends through an orifice provided therefor in the wall of the cylinder 1, and which head is arranged to engage the slight offset 21 cut in the peripheries of the segments 10 and 11. A collar 22 is fixed on said plunger 19, and this collar 22, is held in engagement with the shouldered portion 23, on the inside of the said housing, by a helical spring 24, the pressure of which is regulated by a cap 25, screwed on said housing. Said cap 25, also carries an indicator 26, which is adapted to register with the pressure scale 27, provided on the housings.

In practical operation, one stationary position of the sectors 10 and 11, will be substantially that shown in Fig. 3. The desired weight of the material having been first determined by the scale on the housings 18, material is fed from the hopper 2, to the face of the sector 11, which sector is held against oscillation until the pressure exerted by the plunger heads 20, is exceeded, at which time the pressure of the material on the said sector will overcome the pressure of the plungers, and travel for a half revolution, discharging the material carried thereby through the chute 3. At each half oscillation of the sectors, the plunger heads will engage the peripheries of the sectors, and hold the same against movement, until the weight of the material on the sector equals that indicated on the scale.

What I claim, is:—

1. The combination with a horizontally arranged cylindrical casing having inlet and discharge openings in its peripheral wall, of oppositely-disposed balanced sectors rotatable within said casing close to said peripheral wall, and means for preventing the rotation of said sectors until the weight of material on one sector equals a predetermined amount.

2. The combination with a horizontally arranged cylindrical casing having inlet and discharge openings in its peripheral wall, of oppositely-disposed balanced sectors rotatable within said casing close to said peripheral wall, and means mounted on the cylinder for preventing the rotation of said sectors until the weight of material on one sector equals a predetermined amount.

3. The combination with a horizontally arranged cylindrical casing having inlet and discharge openings in its peripheral wall, of oppositely-disposed balanced sectors rotatable within said casing close to said peripheral wall, and means, mounted on the cylinder and adapted to engage the peripheral surfaces of the sectors, for preventing the rotation of said sectors until the weight of material on one sector equals a predetermined amount.

4. The combination with a horizontally arranged cylindrical casing having inlet and discharge openings in its peripheral wall, of oppositely-disposed balanced sectors rotatable within said casing close to said peripheral wall, each sector being less than a quadrant, and means for preventing the rotation of said sectors until the weight of material on one sector equals a predetermined amount.

5. The combination with a horizontally arranged cylindrical casing having inlet and discharge openings in its peripheral wall, of two oppositely disposed balanced sectors rotatable within said casing close to said peripheral wall, each sector being less than a quadrant, means for yieldingly holding each sector with one side thereof at one side of the inlet opening, and a bar on each sector adapted to register with the opposite side of said opening.

6. The combination with a horizontally arranged cylindrical casing having inlet and discharge openings in its peripheral wall, of two oppositely disposed balanced vanes rotatable within said casing, said vanes having arcuate walls adjacent the peripheral wall of the casing, and means, mounted on the cylinder for yieldingly engaging said arcuate walls, to prevent rotation of the vanes until the weight of material on one vane equals a predetermined amount.

7. The combination with a stationary cylindrical casing provided with inlet and discharge openings in its peripheral wall, of a plurality of balanced sectors within the casing, and a spring-pressed plunger extending through said wall and adapted to engage said sectors, successively.

8. The combination with a stationary cylindrical casing provided with inlet and discharge openings in its peripheral wall, of a plurality of balanced sectors within the casing, a spring-pressed plunger extending through said wall and adapted to engage said sectors, successively, and means for adjusting the pressure applied to the plunger.

9. The combination with a stationary cylindrical casing provided with inlet and discharge openings in its peripheral wall, of a plurality of balanced sectors within the casing, a spring-pressed plunger extending through said wall and adapted to engage said sectors, successively, means for adjusting the pressure applied to the plunger and a scale for indicating the pressure applied to the plunger.

10. The combination with a stationary horizontally arranged cylinder having an inlet opening in its upper side and an outlet opening in its lower side of a shaft in said cylinder, two oppositely disposed balanced vanes on said shaft, each vane comprising a peripheral wall, less than a quadrant, side walls substantially radial to the shaft, end walls which are substantially quadrants, and bars connecting said end walls, and means for holding said vanes stationary and adapted to release the same when the weight of material on a vane equals a predetermined amount.

11. The combination with a cylinder provided with a hopper and a discharge chute, of two oppositely disposed balanced sectors journaled in said cylinder, and a plurality of plungers engaging said sectors to hold same against movement, said sectors being arranged to overcome the pressure of said plungers when the weight of material on one of said sectors exceeds the pressure exerted by said plungers.

12. The combination with a cylinder provided with a hopper and a discharge chute, of two oppositely disposed balanced sectors journaled in said cylinder, spring-pressed plungers bearing against the peripheries of said sectors, and indicators to determine the pressure of said plungers, said sectors being arranged to be overbalanced and discharge the material carried on one of said sectors, when the pressure of the material exceeds the pressure exerted by said plungers.

13. The combination with a cylinder provided with a hopper and a discharge chute, of two balanced sectors journaled within said cylinder, one of said sectors being provided with an opening arranged to be alined with said hopper and to deflect material onto the other of said sectors, housings on said cylinder, spring-pressed plungers within said housings, and caps on said housings provided with indicators to register the pressure of said springs, said plungers being arranged to hold said sectors against movement until the weight of the material on one of said sectors is sufficient to overcome the pressure of said plungers.

In testimony whereof I affix my signature in the presence of two witnesses.

DAVID C. McCAN.

Witnesses:
 RICHARD P. SHEA,
 ANTON GLOETZNER, Jr.